(12) United States Patent
Szymanski

(10) Patent No.: US 7,836,808 B2
(45) Date of Patent: *Nov. 23, 2010

(54) SAFETY CHAIN AND ROTATIONAL DEVICES AND REPLACEABLE TEETH THEREFOR

(76) Inventor: David A. Szymanski, 633 S. St. Mary's St., St. Mary's, PA (US) 15857

( * ) Notice: Subject to any disclaimer, the term of this patent is extended or adjusted under 35 U.S.C. 154(b) by 337 days.

This patent is subject to a terminal disclaimer.

(21) Appl. No.: 11/337,294

(22) Filed: Jan. 23, 2006

(65) Prior Publication Data

US 2007/0169598 A1 Jul. 26, 2007

(51) Int. Cl.
*B26D 1/46* (2006.01)
*B27B 33/02* (2006.01)
*B27B 33/14* (2006.01)
*B27B 33/12* (2006.01)
*B23D 57/00* (2006.01)

(52) U.S. Cl. .............. 83/833; 83/839; 83/843; 83/842; 83/831

(58) Field of Classification Search ........... 83/830–834, 83/839–845

See application file for complete search history.

(56) References Cited

U.S. PATENT DOCUMENTS 1,150,218 A 8/1915 Martin (Continued)

FOREIGN PATENT DOCUMENTS

CA 721087 11/1965

(Continued)

OTHER PUBLICATIONS

Carlton Saw Chain—Saw Chain Product Descriptions, Carlton Company, Inc., 2004 (www.sawchain.com/products/productdescBar.asp?SeriesID=17).

(Continued)

*Primary Examiner*—Ghassem Alie
*Assistant Examiner*—Bharat C Patel
(74) *Attorney, Agent, or Firm*—Fay Sharpe LLP

(57) ABSTRACT

Safety chain and rotatable devices, used on saws or other machines for cutting or abrading material, include a plurality of holding members on which replaceable teeth are retained. Safety lobes prevent the teeth from being dislodged during operation of the saw. The safety lobes may be disposed on a link located in front of the holding member or disposed on a link located in back of the holding member, or both. The teeth can include sharp edges adapted for cutting various materials including wood, plastic and metal and can be formed with abrasive surfaces for abrading materials including brick and concrete. The teeth are quickly removable from the saw without the need for fasteners. While the teeth may be retained by engagement between the teeth and holding member, the chain and rotatable devices may retain the teeth on the holding members using only the safety lobes or safety surfaces. The rotational device can include two blades each including holding members and safety lobes. The blades are positioned and fixed to each other effective to enable the safety lobes of one blade to prevent dislodging the of the teeth of the other blade. The chain and blades can include depth gauges or rakers. Saws or cutting or abrading machines are operated while preventing dislodging of the replaceable teeth. When the device is operated to stop movement of the chain or blades, damaged or worn teeth can be quickly replaced with new or replacement teeth.

17 Claims, 10 Drawing Sheets

U.S. PATENT DOCUMENTS

| | | | |
|---|---|---|---|
| 2,041,347 A | 5/1936 | Jacques | |
| 2,583,243 A | 1/1952 | Tweedie | |
| 2,713,276 A | 7/1955 | Siverson | |
| 2,852,048 A | 9/1958 | Cox | |
| 2,854,866 A | 10/1958 | Mall et al. | |
| 2,884,798 A | 5/1959 | Wilson | |
| 2,978,000 A * | 4/1961 | Raney | 83/831 |
| 2,994,350 A | 8/1961 | Lundberg | |
| 3,180,378 A | 4/1965 | Carlton | |
| 3,227,416 A | 1/1966 | Fessel | |
| 3,444,907 A | 5/1969 | Chadwick | |
| 3,528,465 A | 9/1970 | Omley | |
| 3,547,167 A * | 12/1970 | Raetz | 83/830 |
| 3,590,472 A | 7/1971 | Nix et al. | |
| 3,608,606 A | 9/1971 | Marzocchi | |
| 3,800,633 A | 4/1974 | Funakubo | |
| 3,837,241 A | 9/1974 | Weiss | |
| 3,910,148 A * | 10/1975 | Weiss | 83/833 |
| 4,074,604 A | 2/1978 | Goldblatt et al. | |
| 4,206,253 A | 6/1980 | Watanabe | |
| 4,295,885 A | 10/1981 | Kaarlela | |
| 4,348,927 A | 9/1982 | Olmr | |
| 4,353,277 A | 10/1982 | Silvon | |
| 4,425,830 A * | 1/1984 | Atkinson | 83/833 |
| 4,459,890 A | 7/1984 | Dolata et al. | |
| 4,462,293 A | 7/1984 | Gunzner | |
| 4,484,504 A | 11/1984 | Atkinson | |
| 4,546,755 A | 10/1985 | Gustavsson | |
| 4,558,621 A | 12/1985 | Nitschmann et al. | |
| 4,581,968 A | 4/1986 | Gibson et al. | |
| 4,604,932 A | 8/1986 | Doiron | |
| 4,606,253 A | 8/1986 | Weigel | |
| 4,625,610 A | 12/1986 | Petrovich | |
| 4,627,322 A | 12/1986 | Hayhurst, Jr. | |
| 4,690,024 A | 9/1987 | Chaconas | |
| 4,727,778 A | 3/1988 | Omi | |
| 4,744,278 A | 5/1988 | Wright | |
| 4,756,221 A | 7/1988 | Nitschmann et al. | |
| 5,042,350 A | 8/1991 | Nitschmann | |
| 5,056,395 A | 10/1991 | Sovak et al. | |
| 5,184,598 A | 2/1993 | Bell | |
| 5,257,568 A | 11/1993 | Nitschmann | |
| 5,318,006 A | 6/1994 | Walen | |
| 5,564,996 A | 10/1996 | Sundström | |
| 5,641,921 A | 6/1997 | Dennis et al. | |
| 5,743,163 A | 4/1998 | Lavinder | |
| 5,809,848 A | 9/1998 | Viswanadham et al. | |
| 5,976,455 A | 11/1999 | Pantzar et al. | |
| 6,000,312 A | 12/1999 | Viswanadham et al. | |
| 6,035,844 A | 3/2000 | Otani et al. | |
| 6,286,406 B1 | 9/2001 | Viswanadham et al. | |
| 6,308,606 B1 | 10/2001 | Buchholtz et al. | |
| 6,684,752 B2 | 2/2004 | Satran et al. | |
| 6,748,840 B2 | 6/2004 | Harfst | |
| 6,790,252 B2 | 9/2004 | Smith et al. | |
| 6,871,573 B2 | 3/2005 | Mang | |
| 2002/0124421 A1 * | 9/2002 | Hermes et al. | 30/386 |
| 2003/0126952 A1 | 7/2003 | Duquet | |
| 2004/0025355 A1 | 2/2004 | Harfst | |
| 2004/0134478 A1 * | 7/2004 | Bailey | 125/21 |
| 2004/0141865 A1 | 7/2004 | Keshavan et al. | |
| 2004/0187639 A1 | 9/2004 | Kobayashi | |
| 2005/0115379 A1 | 6/2005 | Schulz et al. | |
| 2005/0142020 A1 | 6/2005 | Akira | |
| 2005/0178263 A1 | 8/2005 | Szymanski | |
| 2005/0276717 A1 | 12/2005 | Fang | |
| 2006/0060030 A1 | 3/2006 | Lowder | |
| 2007/0169598 A1 * | 7/2007 | Szymanski | 83/13 |

FOREIGN PATENT DOCUMENTS

| | | |
|---|---|---|
| DE | 1 040 796 | 9/1956 |
| GB | 2 067 465 | 7/1981 |

OTHER PUBLICATIONS

Village Science: Chainsaw Clutch & Chain (www.ankn.uaf.edu/VS/chainsaw.html), no date.

Carlton Saw Chain—Distributor & Dealer Support, Publications and Promotions, 2004-2005 Product Application Guide, pp. 6-8 and 11, 2004.

Chain Saw Use and Maintenance, pp. 14-27 (www.appalachiantrail.org), no date.

Chain Tooth Parts, (www.forestapps.com/tips/chaintoth/chain.htm), no date.

* cited by examiner

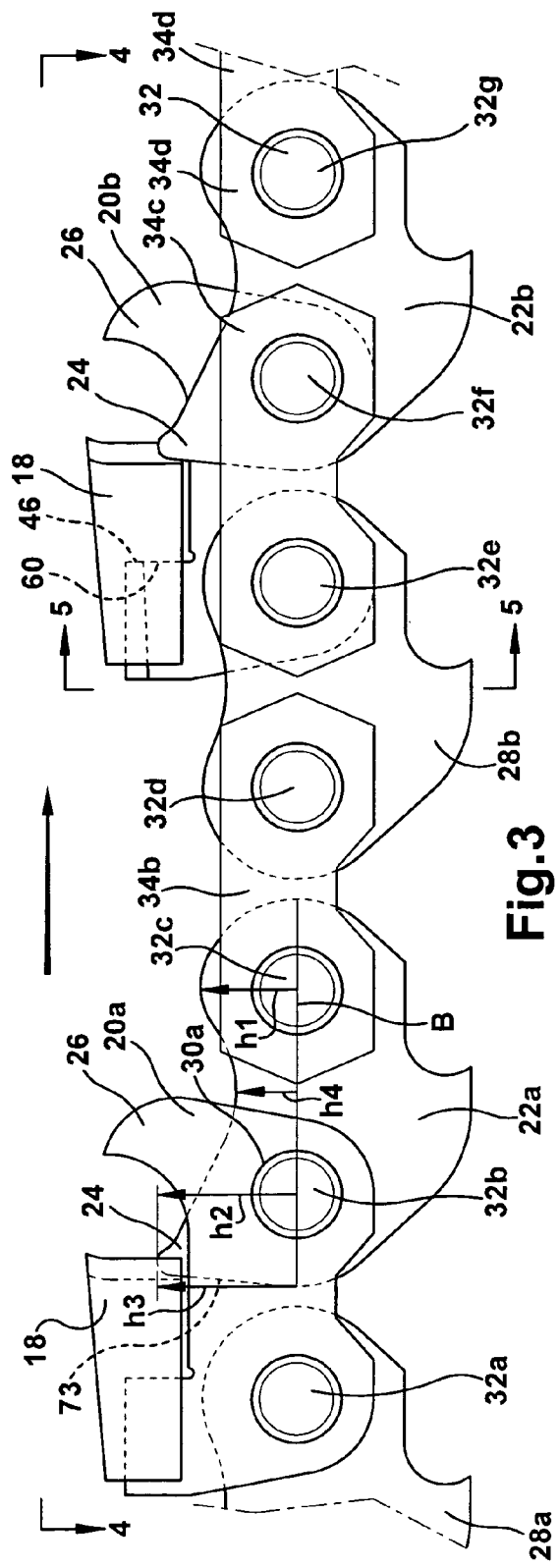

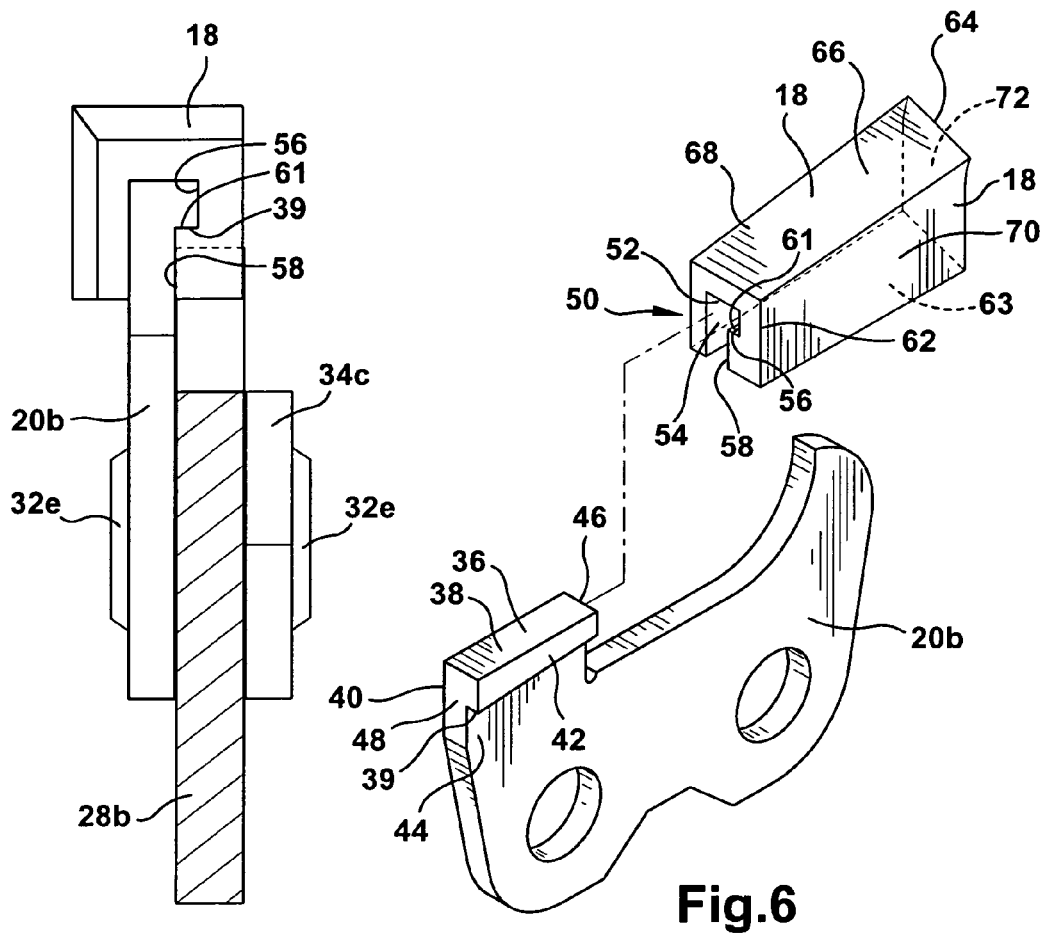
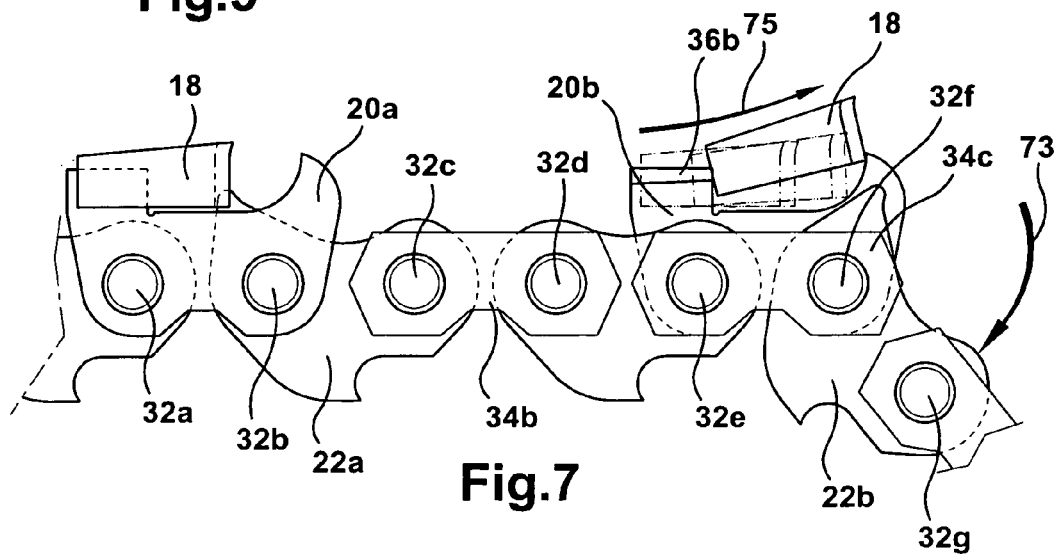

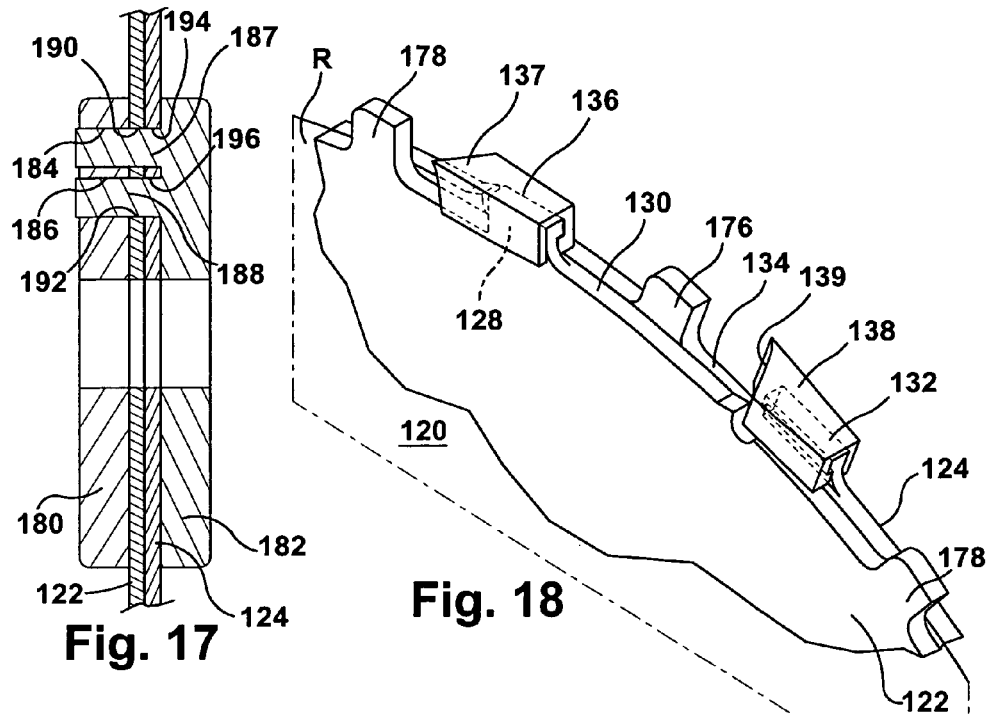
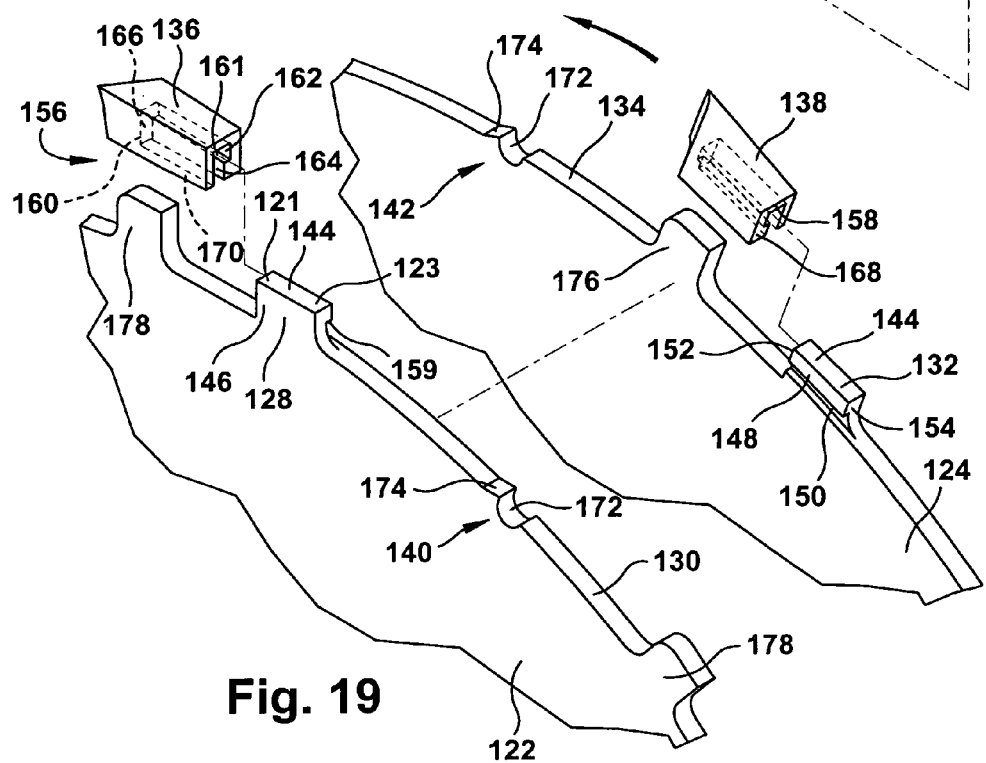
Fig. 17
Fig. 18
Fig. 19

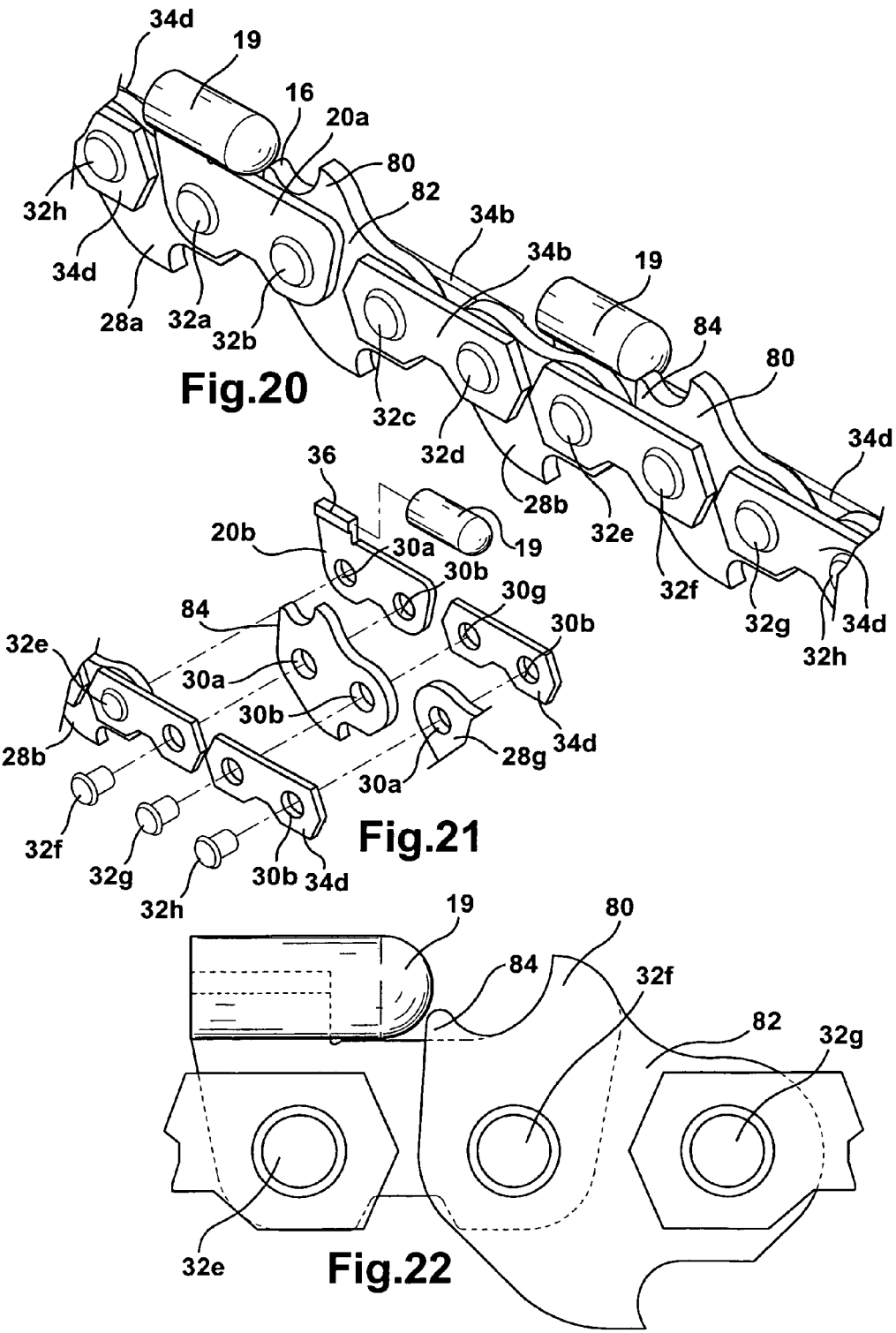

SAFETY CHAIN AND ROTATIONAL DEVICES AND REPLACEABLE TEETH THEREFOR

FIELD OF THE INVENTION

The present invention is directed to the field of saws, machines for cutting or abrading material and replaceable teeth therefor.

BACKGROUND OF THE INVENTION

A variety of devices exist for cutting or abrading materials including masonry, concrete, metal, glass, wood and stone. These devices can employ various implements for cutting or abrading including chain and rotary blades.

In the timber industry, wood is cut, for example, using chain saws and timber harvesters. The particular chain that is used depends on the area and condition of the wood being cut. Normally, steel cutting links having sharp edges are used to cut wood. However, when there is a danger of the chain impacting metal articles in the wood costly carbide tips can be soldered onto the steel cutting links of the chain. This enables the chain to withstand contact with metal articles in the wood without becoming excessively dull. On the other hand, the soldered carbide tips can become dislodged from the steel cutters upon impact with metal articles in the wood.

The sharp edges of all cutting links of saw chain and rotary blades undergo expected wear over time. In the case of chain saws, worn chain is sharpened in the field or replaced with new or sharpened chain, leading to costly down time during the cutting operation or hazard to the worker sharpening the cutting links by hand.

Some attempts have been made to construct chains with removable cutting inserts of various designs typically from steel. These efforts have generally been unsuccessful. Saw chain having removable cutting inserts is currently not used extensively, if at all. U.S. Pat. No. 2,583,243 discloses saw chain including removable teeth wedged into a slot of a head of a link of the chain. U.S. Pat. No. 2,852,048 discloses saw chain with removable teeth having a T-shaped recess that contacts a T-shaped element of a link of the chain. U.S. Pat. No. 3,547,167 discloses a removable cutting sleeve having a recess that receives a stud of a link of the chain.

Cutting links for wood cutting typically are constructed of stamped and machined metal (e.g., steel) and are permanently affixed to other links of the chain. Previously proposed removable cutting inserts were retained on the cutting links using screws or other means. However, so far as the present inventor is aware, such chains do not employ a safety device, apart from cumbersome fasteners or particular engagement between the cutting inserts and cutting links, for avoiding the dangerous condition of the teeth becoming dislodged during operation of the saw.

The timber industry and other fields of cutting or abrading materials could benefit from chain and other rotatable devices for saws that include quickly replaceable teeth, yet also are designed with safety features that protect the operator and those in the vicinity from the dangerous condition of whole teeth being thrown from the saw at high speed.

DISCLOSURE OF THE INVENTION

One embodiment of the present invention features safety saw chain including a plurality of links each having a front end and a back end relative to a direction of travel of the chain. Among the components of the chain there is a holding link, a replaceable tooth, the holding link and the replaceable tooth being adapted to removably retain the tooth on the holding link, and a safety lobe extending from one of the links in proximity to the tooth effective to prevent the tooth from being dislodged from the holding link during travel of the chain. In one aspect, the chain includes a safety link that is pivotably connected near its back end to the front end of the holding link, the safety lobe being integrally formed with and disposed near the back end of the safety link. In another aspect the chain includes a safety link that is pivotably connected near its front end to the back end of the holding link, the safety lobe being integrally formed with and disposed near the front end of the safety link. This safety lobe is arcuate, for example, and the tooth includes an arcuate recess that is configured and arranged to receive the arcuate safety lobe. The chain can include one or both of the leading and trailing safety links and these links can be the same or different in design.

In another aspect of this embodiment, safety chain includes the holding link which has a seating surface. The replaceable tooth includes a seating surface. The tooth is adapted to be removably retained on the holding link such that the seating surface of the tooth engages the seating surface of the holding link. The tooth can be unrestrained by contact with the seating surface of the holding link from movement in the chain travel direction. A safety link comprises a safety lobe extending in proximity to the tooth effective to prevent the tooth from being dislodged from the cutting link during travel of the chain. More specifically, the holding link includes a key member that includes the seating surface of the holding link. The tooth includes a recess configured and arranged to receive the key member, and the recess includes the seating surface of the tooth.

Referring to specific features of the inventive saw chain, the holding link includes a depth gauge located at its front end. Alternatively, the safety link includes a depth gauge located in front of the tooth. The tooth is connected to the holding link without a fastener (e.g., without a screw). The chain includes alternating right-handed and left-handed teeth. The chain has a central axis along the chain travel direction. The left-handed teeth have cutting edges that extend from the central axis outwardly on a left side of the chain and the right-handed teeth have cutting edges that extend from the central axis outwardly on a right side of the chain. The saw chain is adapted for use on a saw selected from the group consisting of a chain saw, a timber harvester, a rescue saw, a buck saw and a saw for cutting wood pallets. The tooth includes a sharp cutting edge that can adapted to cut various materials including wood, plastic and metal. The tooth can include a surface adapted for abrasion of material including masonry (e.g., brick), glass, concrete and pavement. The chain includes connector straps that each include a pair of holes. The links each include a pair of holes. Rivets are disposed in aligned holes of the links and connector straps.

A method of safely operating the saw chain according to the present invention includes providing the saw chain with the holding link, tooth and the safety link comprising a safety lobe extending in proximity to the tooth. The saw is operated to move the chain at a speed suitable for cutting or abrading. During this operation, dislodging of the teeth in the direction of chain travel is obstructed with the safety lobes. In a further aspect of the method, the saw is operated to stop movement of the chain. When the operator determines that a tooth should be replaced, the chain is removed from the saw and pivoted so as to move the safety lobe out of a path of the tooth. The tooth is removed from the chain in the chain travel direction. A replacement tooth is inserted on the holding link in a direction opposite to the direction of chain travel and the chain is pivoted to move the safety link back into the path of the tooth.

A second embodiment of the invention features a safety rotational device for use in a saw. First and second circular blades are adapted for rotation about a common central axis and disposed in a fixed rotational position relative to each other. A plurality of first holding members are disposed at a periphery of the first blade, each having a front end and a back end relative to a rotational direction of the circular blades. A plurality of second holding members are disposed at a periphery of the second blade, each having a front end and a back end relative to a rotational direction of travel of the circular blades. A plurality of first replaceable teeth are adapted to be removably retained on the first holding members. A plurality of second replaceable teeth are adapted to be removably retained on the second holding members. A plurality of first safety lobes are each disposed on the first blade leading one of the second holding members in the rotational direction. One of the first safety lobes extends in proximity to one of the second teeth effective to prevent the second tooth from being dislodged from the second holding member during travel of the blades. A plurality of second safety lobes are each disposed on the second blade in front of one of the first holding members in the rotational direction. One of the second safety lobes extends in proximity to one of the first teeth effective to prevent the first tooth from being dislodged from the first holding member during travel of the blades. A plurality of first depth gauge members are each disposed at a periphery of the first blade in front of one of the first holding members relative to the rotational direction; and a plurality of second depth gauge members are each disposed at a periphery of the second blade in front of one of the second holding members relative to the rotational direction. While the depth gauge members may be optional in the case of an automated saw, when cutting with a hand saw or saw under the control of an operator, the depth gauge members may be desirable. More specifically, each of the teeth includes a surface adapted for abrasion of material (e.g., concrete or pavement material). Alternatively, each of the teeth includes a sharp edge adapted for cutting material (e.g., wood, plastic or metal).

Another aspect of the second embodiment features only one safety blade in view of the potential consumer demand for only a single replacement blade. The safety blade comprises a circular blade body adapted for rotation about a central axes, the blade body having an outer peripheral surface. A plurality of holding members are disposed at the peripheral surface each having a front end and a back end relative to a rotational direction of travel of the blade body. A plurality of replaceable teeth are adapted to be removably retained on the holding members. A plurality of optional depth gauge members are each located at a front end of one of the holding members relative to the rotational direction and extend a predetermined height from the peripheral surface. A plurality of safety lobes are located between the depth gauge members and the holding members and extend from the peripheral surface to a height less than the height of the depth gauge members. The teeth of the single blade are either all left-handed or all right-handed. This enables the consumer to replace either the left or right blade.

Another aspect of the second embodiment features a safety rotational device comprising first and second components each of which includes the following. A circular blade is adapted for rotation about a central axis, the blade having an outer peripheral surface. A plurality of holding members are disposed at the peripheral surface each having a front end and a back end relative to a rotational direction of travel of the blade. A plurality of replaceable teeth are adapted to be removably retained on the holding members. A plurality of optional depth gauge members each extend a predetermined height from the peripheral surface in front of one of the holding members relative to the rotational direction. A plurality of safety lobes are located between the holding members and the depth gauge members and each extends a predetermined height from the peripheral surface. The height of the depth gauge members is greater than the height of the safety lobes. The circular blade of the first component is rotationally offset in a fixed position from the circular blade of the second component about the central axis. The safety lobes of the first component are disposed in front of and in proximity to the teeth of the second component effective to prevent the teeth of the second component from being dislodged from the holding members of the second component. The safety lobes of the second component are disposed in front of and in proximity to the teeth of the first component effective to prevent the teeth of the first component from being dislodged from the holding members of the first component.

Referring to more specific features of aspects of the second embodiment of the invention, the teeth on the first component are left-handed and the teeth on the second component are right-handed. The holding member includes a seating surface. Each of the teeth includes a seating surface that engages the seating surface of a corresponding one of the holding members. The teeth are unrestrained by the seating surfaces of the holding members from movement in the rotational travel direction. Each of the teeth has a sharp cutting edge adapted to cut material (e.g., wood, metal or plastic). Alternatively, each of the teeth includes a surface adapted for abrasion of material (e.g., masonry, glass pavement or concrete). The rotational device is adapted for use on devices besides saws, e.g., weed cutters.

The safety device can include two clamping disks having smaller diameters than the blades and between which the blades are clamped. The blades including two openings and one of the clamping disks has at least one opening. Two pins each protrude from one or both of the clamping disks into the openings of the blades and into the opening of the other clamping disk. For example, one clamping disk includes two pins, the other includes two openings that receives the pins. The openings of the blades can be located different distances from the central axis. Alternatively, one of the pins has a larger diameter than the other pin.

A method of safely operating the rotational safety cutting device of the second embodiment includes providing the first and second components of the device. The circular blade of the first component is positioned so as to be rotationally offset and in a fixed position relative to the circular blade of the second component. The safety lobes of the first component are disposed in front of and in proximity to the teeth of the second component and the safety lobes of the second component are disposed in front of and in proximity to the teeth of the first component. A machine is operated to rotate the circular blades. Movement of the teeth of the first component in the rotational direction is obstructed with the safety lobes of the second component. Movement of the teeth of the second component in the rotational direction is obstructed with the safety lobes of the first component. A further aspect of this method includes operating the machine to stop rotation of the components. When it is determined that a tooth should be replaced, the blade of the first component is unfixed from the blade of the second component. The tooth is removed from the holding member in the rotational travel direction. A replacement tooth is inserted on the holding member in a direction opposite to the rotational travel direction. The blade of the first component is fixed to the blade of the second component. The device includes the replacement tooth after this procedure.

It should be understood that the present invention is not limited by descriptive terms such as left, right, front, back, top, vertical and the like as these terms are provided to improve understanding and apply to the views shown in the drawings. These relative terms can differ upon change in the orientation and position of the chain and teeth.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents embodiments that should not be construed as necessary limitations of the broad invention as defined in the claims.

BRIEF DESCRIPTION OF THE DRAWINGS

FIG. 3 is a side elevational view of the saw chain of FIG. 1;

FIG. 4 is a top plan view of the saw chain as seen along the lines and arrows designated 4-4 in FIG. 3;

FIG. 5 is a vertical cross-sectional view as seen along the lines and arrow designated 5-5 in FIG. 3;

FIG. 6 is a perspective view of one of the holding links and teeth;

FIG. 7 is a side elevational view of the saw chain of FIG. 1 showing how a safety lobe of a leading link can be rotated out of the path of a tooth for removal and replacement of the tooth;

FIG. 17 is a cross-sectional view taken along lines and arrows 17-17 in FIG. 15;

FIG. 18 is an enlarged perspective view of the device shown in FIG. 15;

FIG. 19 is an exploded view of the device shown in FIG. 18;

FIGS. 20-22 illustrate saw chain including teeth adapted for abrasion of material;

DETAILED DESCRIPTION

Figure 1:
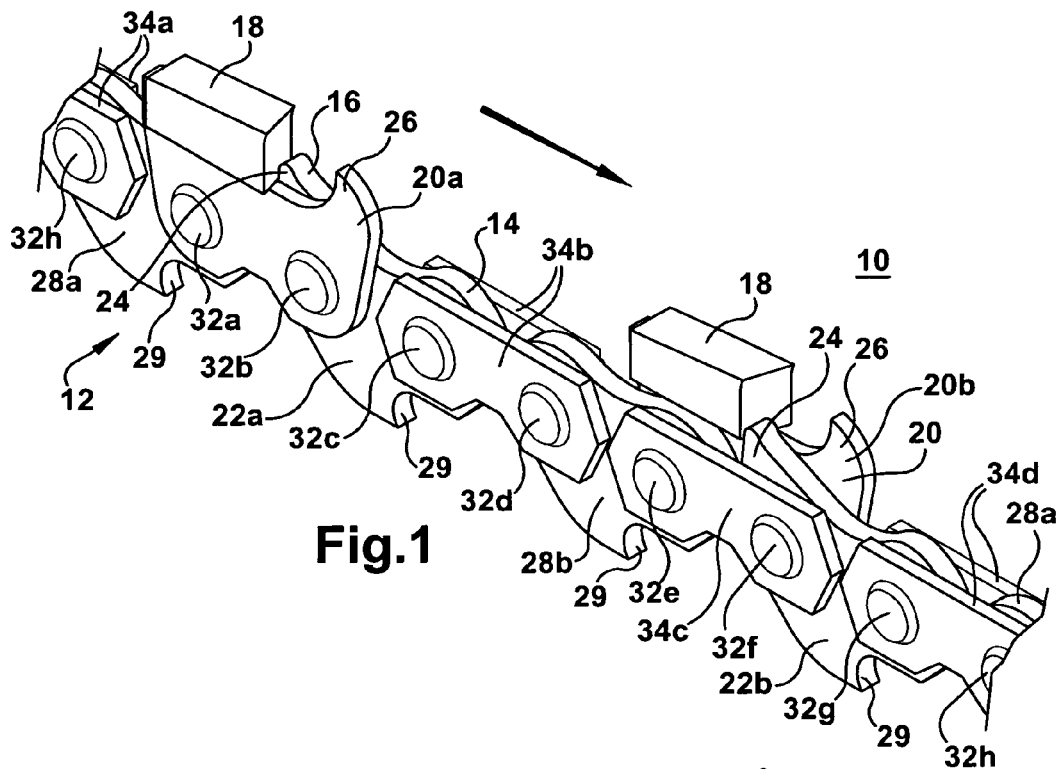
FIG. 1 is a perspective view of saw chain constructed in accordance with the present invention.
Figure 2:
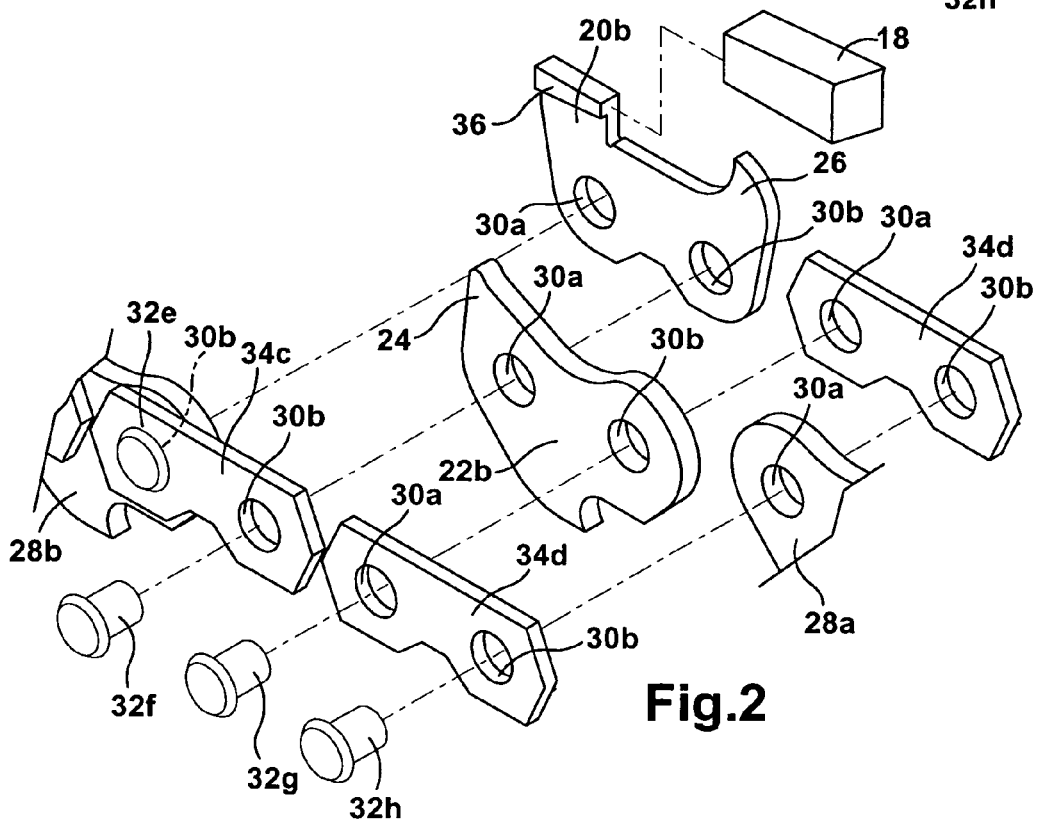
FIG. 2 is an exploded view of the saw chain of FIG. 1.

Referring now to FIGS. 1-7 of the drawings, one embodiment is directed to safety saw chain 10 including a plurality of links 12 each having a front end 14 and a back end 16 relative to a direction of travel of the chain (shown by the arrow) around the bar of a saw in a known manner. A plurality of replaceable teeth 18 are each adapted to be removably retained on one of a plurality of holding links 20. The combination of holding link 20 and replaceable tooth 18 functions as a conventional one-piece cutting link. The chain includes a plurality of safety links 22 each being located in front of one of the holding links. Each safety link 22 includes a safety lobe 24 extending in proximity to a tooth effective to prevent the tooth from being dislodged from the holding link during travel of the chain. The holding link includes a depth gauge or raker 26 located in front of the tooth. Other links in the chain of this particular design are contemplated in the invention. For example, drive links or drivers 28 engage the chain saw sprocket and optional sprocket at the end of the guide bar in a conventional manner. Drive links 28 and safety links 22 include surfaces 29 for engaging a sprocket of the saw.

The safety links, holding links, drive links and other links of the chain, each include a pair of rivet holes 30. Connector or tie straps 34 along the chain each include a pair of rivet holes 30. Rivets 32 are disposed in aligned rivet holes of the holding links, safety links, drive links, and other links, and the connector straps, which pivotally connect the links together.

The holding links and safety links are used with other links of the chain in any standard wood-cutting or other chain design (e.g., plastic or metal cutting). For example, in wood cutting the cutting links (i.e., the holding links of the invention) may be used in full compliment, semi-skip (half skip) and full skip chains, referring to the number of tie straps between cutting links. The 2003 website by Manufacturer's Supply Inc., which is incorporated herein by reference in its entirety, describes the chain designs as follows: full compliment chain has a first cutter, tie strap and another cutter (e.g., right cutter, tie strap, left cutter, tie strap, right cutter, etc.); semi-skip chain has alternating one and two tie-straps after cutters (e.g., right cutter, tie strap, left cutter, two ties straps, right cutter, etc.); and full skip chain has two tie straps after cutters (e.g., right cutter, two tie straps, left cutter, two ties straps, right cutter, etc.). The inventive holding link is suitable for all chain pitches (defined as the distance between three consecutive rivets divided by two), including ¼, 0.325, ⅜, ⅜ extended, 0.404, ½ and 0.750 inch pitches. The particular chain shown in FIGS. 1-14 is particularly suitable for use on chain saws. The chain may be used on a variety of other saws as well including, but not limited to a timber harvester, a rescue saw, a buck saw and a saw for cutting wood pallets.

The holding links 20 each include a holding or key member 36 having at least one seating surface. The key member 36 shown in FIGS. 2 and 6 has an inverted-L shape and includes a top surface 38, a long side surface 40, first and second short side surfaces 42, 44, and front and back surfaces 46, 48. Each tooth 18 includes a recess 50 configured and arranged to receive the key member 36. The recess can have an inverted-L shape that corresponds to the inverted-L shaped holding member and includes a top recess surface 52, a long side recess surface 54, first and second short side recess surfaces 56, 58, and a front recess surface 60. The recess includes at least one seating surface. Seating surfaces are surfaces of the tooth and holding member that contact each other. Between the short side recess surfaces 56 and 58 is seating surface 61 extending along the length of the tooth. The seating surface 61 engages seating surface 39 of the holder. The L-shaped recess is open at a back surface 62 of the tooth and at a bottom tooth surface 63. It will be appreciated by those of ordinary skill in the art in view of this disclosure that the figures show but one example of a suitable design for the holding member and tooth. The tooth could include a stud and the holding member could include a recess that receives the stud. The key member and tooth recess could include other shapes such as a T-shape. These and many other variations in the design of the teeth and holding members are possible and contemplated to be within the scope of the present invention.

The teeth are inserted onto the chain by pushing each tooth so that the holding member moves into the tooth recess. The holding member front surface 46 may engage the front tooth recess surface 60 (FIG. 3), which prevents the tooth from moving in the direction opposite to the chain travel direction. The seating surfaces of the holding member and tooth engage each other when the tooth is disposed on the holding member during operation of the saw.

A function of the saw chain of the present invention is to enable material to be cut or abraded using teeth that are quickly replaceable and yet safe. In this regard, the teeth advantageously engage the holding members without the need for fasteners (e.g., screws). The teeth can be held in place on the holding members in various ways as would be appreciated by those skilled in the art reading this disclosure. The seating surfaces of the holding members and teeth (e.g. seating surface 39 of the holding member and seating recess surface 61) can be tapered as disclosed in the U.S. patent application Ser. No. 10/780,323, which is incorporated herein by reference in its entirety. These "wedge and taper" surfaces inhibit the tooth from moving in a direction opposite to the chain travel direction. The wedge and taper also inhibit movement of the tooth in the chain travel direction. When the teeth are retained on the holding members with the interacting wedge and taper feature, a specialty tool or hammer is used to remove them in the chain travel direction.

The present invention is not limited to the wedge and taper or other design of holding member and teeth. In fact, in one aspect of the invention the holding members do not prevent movement of the teeth in the chain travel direction. Movement of the teeth 18 in the chain travel direction is prevented entirely by the safety lobes 24. This enables very fast replacement of the teeth without the need for a tool (e.g., specialty tool or hammer) which would otherwise be used to remove teeth held in place on the holding members by engagement of tapers and wedges as described in the patent application Ser. No. 10/780,323.

The teeth 18 alternate right- and left-handed along the chain (i.e., left-handed tooth, right-handed tooth, left-handed tooth, etc.). Referring to FIG. 4, the chain 10 has a central axis C along the chain travel direction. The left-handed teeth 18a have cutting edges 64 that extend from the central axis C outwardly on a left side L of the chain; and the right-handed teeth 18b have cutting edges 64 that extend from the central axis C outwardly on a right side R of the chain. The cutting edges 64 are adapted to cut various materials. One material that the teeth are ideally suited to cut is wood. Alternatively, the cutting edges 64 are designed for abrasion of material. Abrading teeth can have various compositions tailored to the particular material being abraded (e.g., masonry, concrete or other refractory material). Examples of teeth 19 formed of abrading material (e.g., silicon carbide) are shown in FIGS. 20-22 where like parts share like reference numerals as FIGS. 8-10.

The features of the replacement teeth 18 used on the saw chain of FIGS. 1-7 are shown in FIGS. 23-27. The sharp cutting edge 64 penetrates wood fibers or other material being cut (e.g., plastic). The top surface 66 of the tooth affects the width of the saw kerf. The tooth has side surfaces 70 that extend at angle β(e.g., 3°). The tooth has an angle α, which is in the range of, for example, 0 to 90°. In this exemplary design of FIGS. 23-26 the chisel angle α is 60°. A front surface 72 of the tooth forms the cutting edge 64 at an upper location. The front surface includes upper and lower surfaces 200, 202. The upper surface 200 is chamfered or concave. The concave surface has a certain radius of curvature r for a given chain pitch that is proportional to a radius of about 0.25 inch for a chain pitch of 0.750 inch. That is, about 0.25 inch is the radius of curvature for a large 0.750 pitch chain. The radius of curvature of the upper front surface 200, and in particular, of all geometries of the teeth and holding member, would be smaller for smaller pitch chains. The radius of curvature r may vary, such as being smaller than about 0.25 inch for a chain pitch of 0.750 inch. The right side of this particular tooth includes an upper surface 204 and a lower surface 206. The upper surface 204 extends generally vertically and the lower surface 206 extends inwardly at an angle γ of, for example, 5° (FIG. 27) for providing clearance of the tooth as it cuts through material (e.g., wood). The seating tooth recess surface 61 is tapered in this particular design, e.g., at angle δ (e.g., 3.000 to 3.125 degrees), which engages the correspondingly tapered seating surface 39 on the holder as disclosed in the application Ser. No. 10/780,323. Any of the surfaces of the holding member and tooth recess may be tapered as disclosed in the application Ser. No. 10/780,323.

The teeth and/or holding links can be formed of any suitable cutting, abrading or wear-resistant materials. One suitable material is sintered and compacted particulate material, known as powdered metal as disclosed in the patent application Ser. No. 10/780,323 or known to those of ordinary skill in the art. One suitable material for forming abrading teeth is ceramic such as silicon carbide.

Referring to FIGS. 3 and 4, a left side connector strap 34a has a back hole 30a aligned with a front hole 30b of a drive link 28a and with a back hole 30a of a right-handed holding link 20a. The links are secured with a rivet 32a. The drive link 28a is sandwiched between the connector strap 34a and the right-handed holding link 20a. The front hole 30b of that left side connector strap 34a is aligned with the back hole 30a of a safety link 22a and with a front hole 30b of the right-handed holding link 20a. The links are secured with a rivet 32b. The safety link 22a is sandwiched between the left side connector strap 34a and the right-handed holding link 20a. The front hole 30b of the safety link 22a is aligned with back holes 30a of a pair of connector straps 34b and secured by rivets 32c. The front holes 30b of the connector straps 34b are aligned with a back hole 30a of a drive link 28b and secured by rivets 32d. The back hole 30a of the next right side connector strap 34c is aligned with a front hole 30b of the drive link 28b and with a back hole 30a of a left-handed holding link 20b. The links are secured by a rivet 32e. The drive link 28b is sandwiched between the connector strap 34c and the left-handed holding link 20b. The front hole 30b of that connector strap 34c is aligned with a back hole 30a of the next safety link 22b and with a front hole 30b of the left-handed holding link 20b. The links are secured with a rivet 32f. The safety link 22b is sandwiched between the left-handed holding link 20b and the right connector strap 34c. A front hole 30b of the safety link 22b is aligned with back holes 30a of a pair of connector straps 34d. The safety link 22b is sandwiched between the connector straps 34d. The links are secured with a rivet 32g. A back hole 30a of the drive link 28a is aligned with front holes 30b of the pair of connector straps 34d. The drive link 28a is sandwiched between the connector straps 34d. The links are secured by a rivet 32h (FIG. 1). The sequence of components of the chain repeats in this or a similar fashion depending on the chain design (e.g., full compliment, semi-skip (half skip) and full skip chains).

Referring to FIG. 3, the safety link 22a includes an imaginary reference line B that intersects the centerpoints of the front and back rivet holes 30b, 30a of the safety link. The body of the safety link has a height h1 along the arrow at a location perpendicular to the reference line B and intersecting a centerpoint of the front hole 30b of the safety link 22a. The safety lobe 24 of the safety link extends to a height h2 along the arrow perpendicular to the reference line B and intersecting the centerpoint of the back hole 30a of the safety link 22a. The safety lobe 24 is located in a region in the chain travel direction between the line h2 and a line h3 extending perpendicular to the reference line B at the most trailing end surface 73 of the safety link. The height h2 is greater than the height h1. The central portion of the body of the safety link has a height h4 perpendicular to the reference line B at the midpoint between lines h1 and h2. h2<h1<h4. In other words, the safety lobe 24 extends to a maximum height of the safety link (height h2) that is higher than the front portion of the safety link (height h1), which extends higher than the central portion of the safety link (height h4) that is approximately at a minimum height of the safety link.

In a method of safely operating saw chain of the first embodiment, the saw is operated to move the chain by powering the motor to rotate the chain upon engagement of the drive links of the chain with the chain saw sprocket and optional sprocket at the end of the guide bar (not shown) in a known manner. Initially the teeth are all new, sharpened or contain a maximum amount of cutting or abrasion material (e.g., sharpened teeth). The saw is used to cut or abrade the intended material. During operation of the saw, at which time the chain rotates around the bar, dislodging of the teeth from the holders in the chain travel direction is prevented by the safety lobes. This ensures safe operation in that the dangerous condition in which whole teeth are dislodged in the chain travel direction is avoided. Breakage of portions of the teeth may be unavoidable, as occasionally occurs in the breakage of soldered tips from steel teeth. However, this condition can be accounted for with proper safety goggles and other conventional safety equipment and procedures. The saw is operated (e.g., shut off) to stop movement of the chain. The chain is removed from the saw.

Once it is determined by the user that one or more teeth should be replaced, such as due to damage or wear of the teeth, the safety link is pivoted out of a path of an adjacent tooth needing replacement. Referring to FIG. 7, safety link 22b is pivoted downward out of the path of the tooth 18 (in the clockwise direction of arrow 73). This enables the tooth 18 to be removed from the holding member 36b in the direction shown by arrow 75 and replaced with a new or replacement tooth 18' in the direction opposite to arrow 75. The chain is pivoted back to an operational position. That is, the safety link 22b is pivoted in the counterclockwise direction. The chain is then re-installed onto the bar of the saw. This entire operation can be done quickly and economically compared to sharpening teeth or replacing the entire chain. In addition, cutting or abrading is performed safely despite the use of the quickly replaceable teeth.

Figure 8:
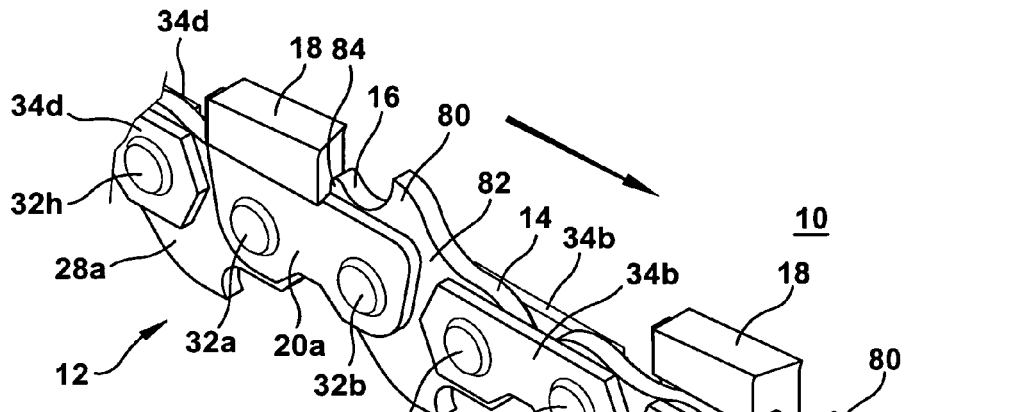
FIG. 8 is a perspective view showing another aspect of the inventive saw chain wherein the safety links include rakers.
Figure 9:
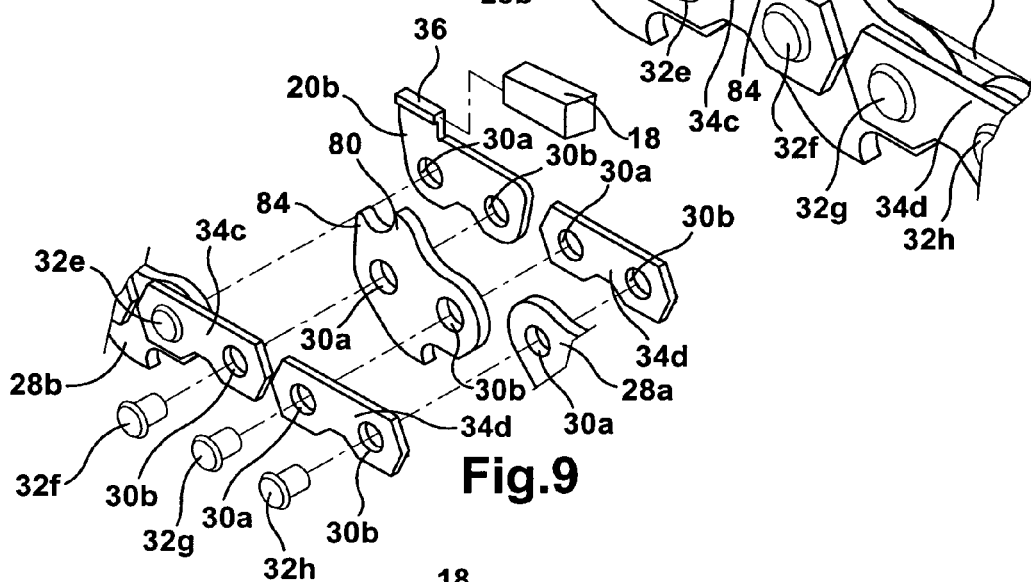
FIG. 9 is an exploded view of the saw chain shown in FIG. 8.
Figure 10:
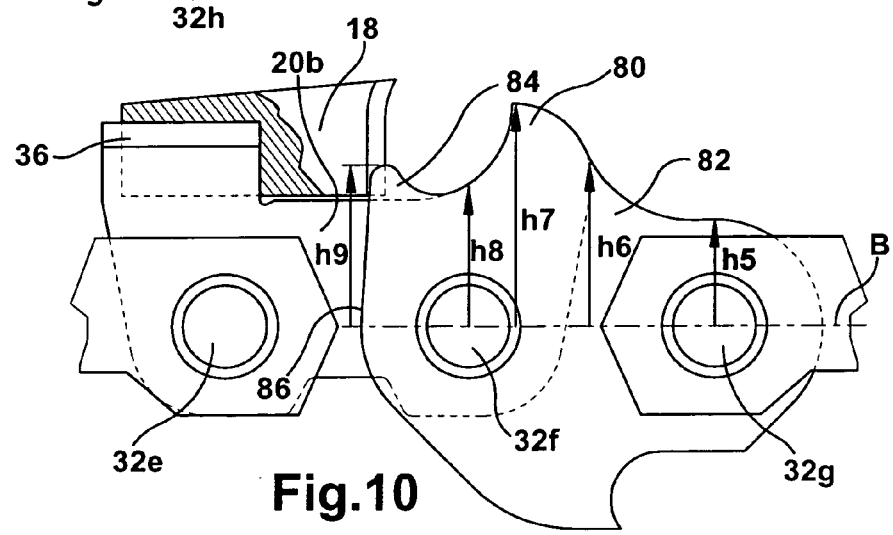
FIG. 10 is a side elevational view of a portion of the saw chain shown in FIG. 8.

The saw chain of the present invention may include various modifications that would be apparent to those of ordinary skill in the art in view of this disclosure. In this disclosure like components are given like reference numbers throughout the several views. As shown in FIGS. 8-10, one modification compared to the chain shown in FIGS. 1-7 is that the depth gauges or rakers 80 are disposed on the safety links instead of on the holding links 20. This design is suitable for automated saws, despite kickback that occurs when cutting wood near the end of the bar, in that such saws present fewer safety concerns for the operator.

Referring to FIG. 10, the safety link 82 includes an imaginary reference line B that intersects the centerpoints of the front and back rivet holes 30b, 30a of the safety link. The body of the safety link has a height h5 along the arrow at a location perpendicular to the reference line B and intersecting a centerpoint of the front hole 30b of the safety link 82. The safety lobe 84 of the safety link extends to a height h9 along the arrow perpendicular to the reference line B at the most trailing end surface 86 of the safety link. The safety lobe 84 is located in a region in the chain travel direction between the line h9 and a line h8 extending perpendicular to the reference line B at an intersection of the centerpoint of the back hole 30a. The central portion of the body of the safety link has a height h6 perpendicular to the reference line B at the midpoint between lines h5 and h8 from the hole centerpoints. The raker 80 extends to a height h7 along the arrow perpendicular to the reference line B located approximately at a midpoint between lines h6 and h8. h7<h9<h5. In other words, the raker 80 extends at a maximum height (h7) of the safety link, the front portion extends to a minimum height (h5) and the safety lobe 84 (height h9) extends at an intermediate height between heights h7 and h5.

Figure 11:
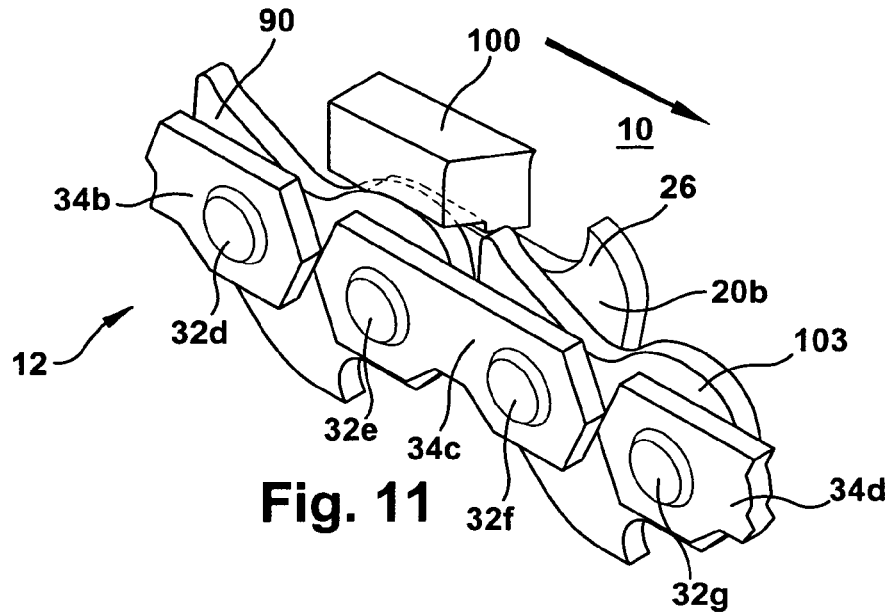
FIG. 11 is a perspective view of a portion of saw chain featuring another aspect of the present invention wherein one of the links includes a safety lobe that retains the tooth on the holder.
Figure 12:
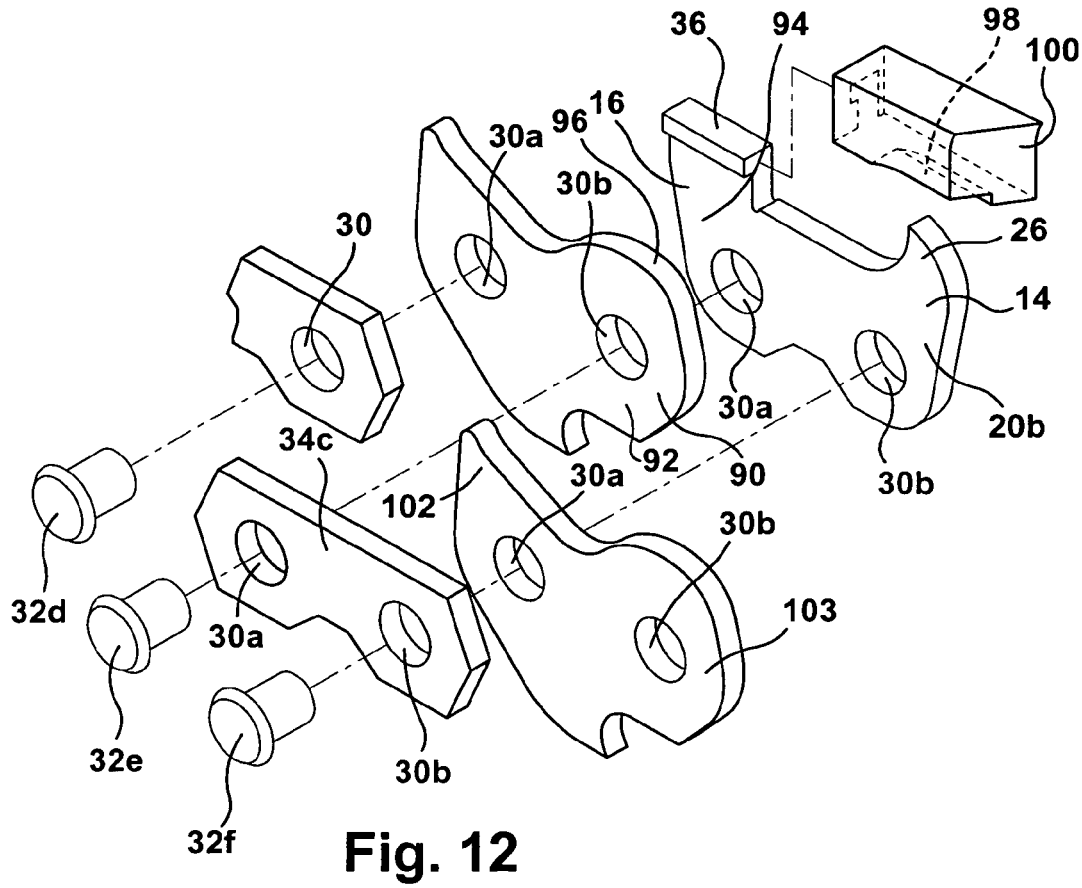
FIG. 12 is an exploded view of the components of the chain shown in FIG. 11.

Referring to FIGS. 11-14, in other embodiment the link that is trails the holding link (e.g., a drive link 90 as shown in FIG. 11) has its front end 92 pivotably fastened to the back end 94 of the left side holding link 20b. The link 90 is also a safety link and includes a cam-shaped or arcuate surface 96 at its front end, which is received in a cam-shaped or arcuate recess 98 formed in a lower surface of a corresponding tooth 100 (FIG. 12). The arcuate surface 96 and arcuate recess 98 may have other shapes and sizes as would be appreciated by one of ordinary skill in the art reading this disclosure. This safety feature ensures that the teeth are seated against the front of the keys 36 and limits tooth movement during operation of the saw especially when no means for retaining the teeth is employed on the holding members (e.g., no wedge and taper).

In the design shown in FIGS. 11 and 12, the drive link 90 and the safety link 22 can be the same link. However, the drive and safety links can be separate links on the chain depending on the number of links between holding links. In addition, it might be desirable to provide the leading safety link 22 with one design and the trailing link 90 with a different design. The safety cam member 96 is usable alone, or in conjunction with the safety lobe 102 and/or means on the holding members for retaining the teeth. If the teeth and holding members have the corresponding wedge and taper design, or some other means for retaining the teeth on the holding members, the cam safety member 96 and cam recess 98 alone, without the leading safety lobe 102, may be sufficient to prevent movement of the teeth on the holders in the direction of chain travel. Even without the wedge and taper design or other means on the holder for retaining the teeth in position, in which case the teeth can move freely on the holding members, the safety cams 96 and cam recesses 98 alone may be sufficient to retain the teeth on the holding members without the need for the leading safety lobe 102. However, those of ordinary skill in the art will appreciate in view of this disclosure the benefit of having multiple safety features: the combination of the leading safety lobe 102 of safety link 103 and the safety cam 96/cam recess 98, whether on the same or different links. This combination of safety features can be used with or without the wedge and taper design or other means for retaining the teeth in place on the holders.

Figure 13:
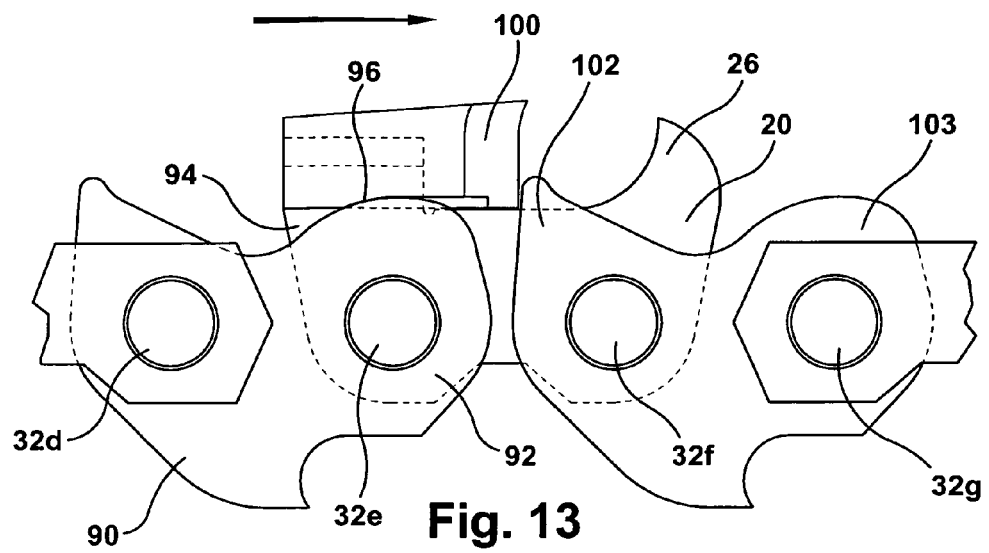
FIG. 13 is a side elevational view of the saw chain shown in FIG. 11.
Figure 14:
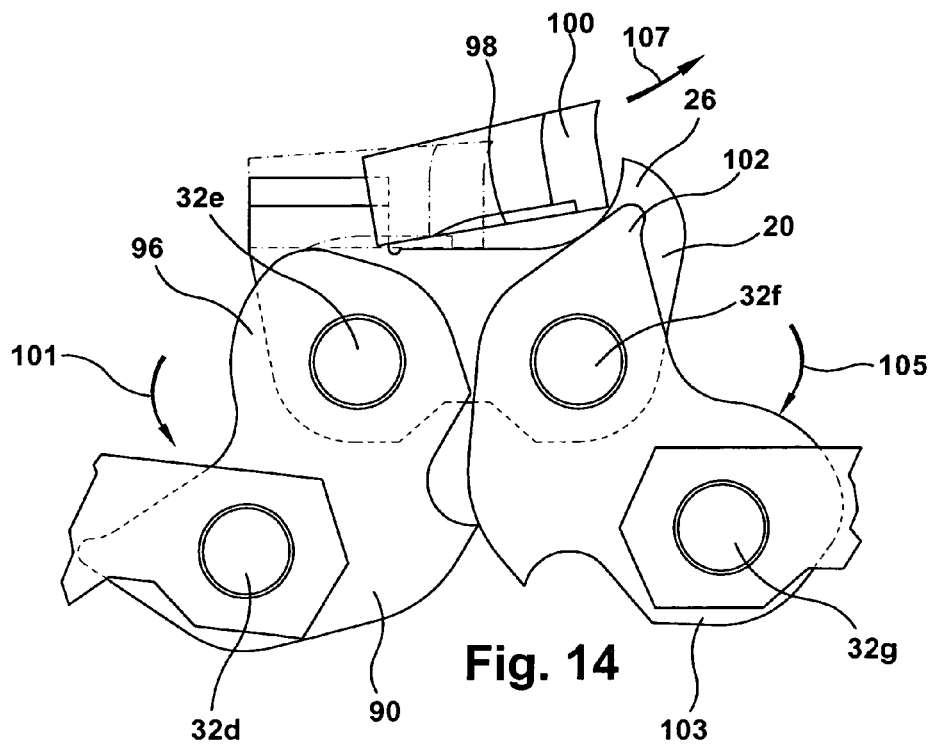
FIG. 14 is a side elevational view of the saw chain shown in FIG. 13 showing how the safety cam and safety lobe are rotated out of the path of the tooth permitting its removal and replacement.
Figure 15:
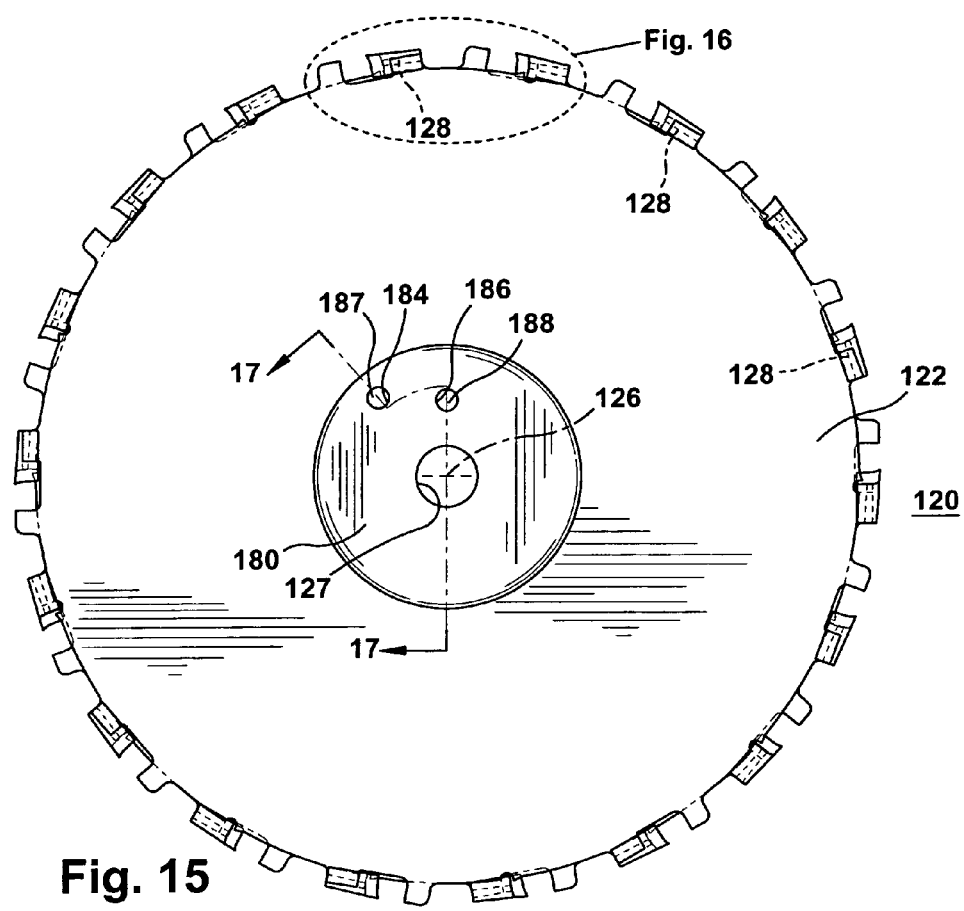
FIG. 15 is a side elevational view of a rotational cutting device constructed in accordance with the present invention.
Figure 16:
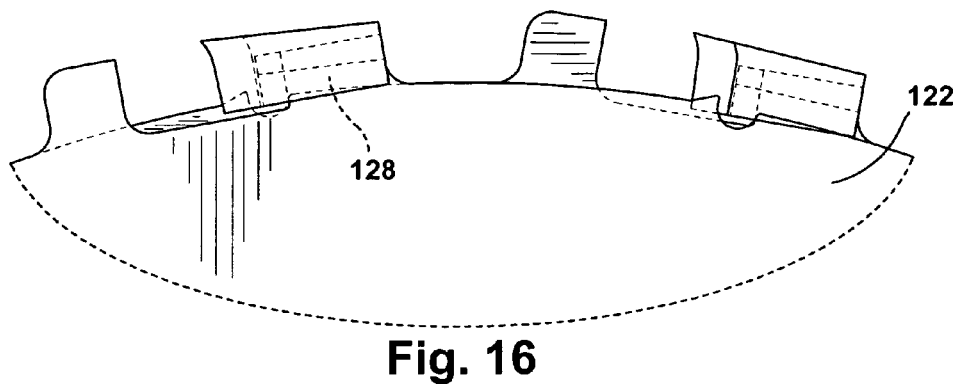
FIG. 16 is an enlarged view of a portion of the device shown in FIG. 15.
Figure 23:
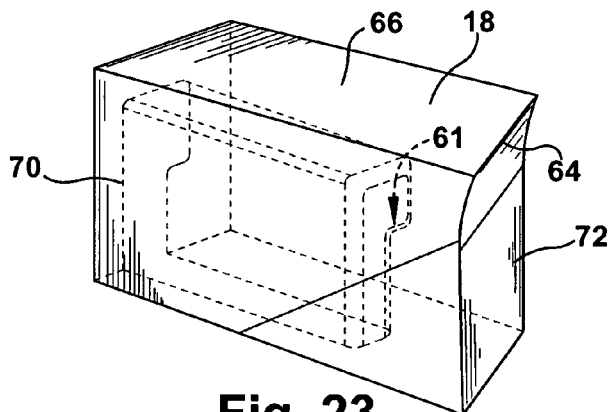
FIGS. 23-27 illustrate replaceable teeth adapted for cutting material, used in the saw chain of FIGS. 1-10.
Figure 24:
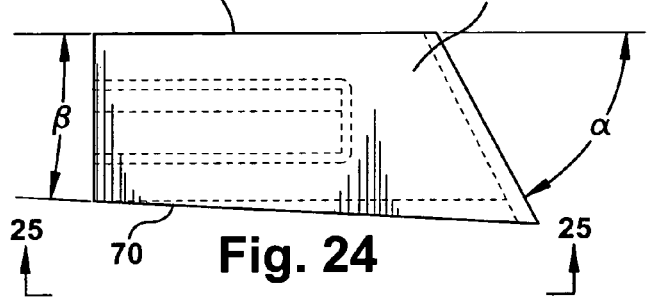
Figure 25:
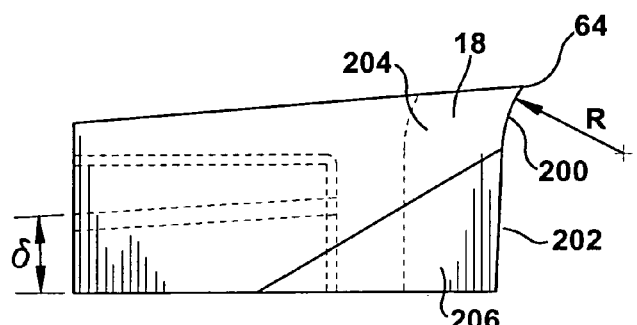
Figure 26:
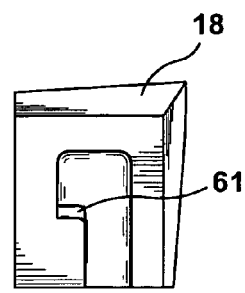
Figure 27:
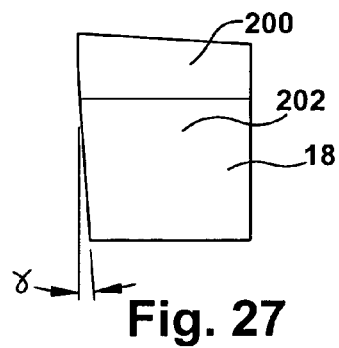

In the tooth replacement procedure shown in FIGS. 13 and 14, the chain is removed from the saw. The tooth 100 can be removed by rotating the link 90 counterclockwise along arrow 101 such that the cam surface 96 does not engage the cam recess 98. If the safety lobe 102 is also used as shown in FIG. 14, the safety link 103 is rotated clockwise along arrow 105 so that the safety lobe 102 does not obstruct movement of the tooth 100 in the chain travel direction. The tooth 100 is then removed from the holding member in the direction of arrow 107. If the tooth is retained using the wedge and taper, it is removed with a suitable tool. A replacement tooth is installed in a direction opposite the arrow 107. The links 90 and 103 are rotated clockwise and counterclockwise, respectively, and the chain is re-installed on the saw.

Referring to FIGS. 15-19, in another embodiment a safety rotational cutting device 120 for a saw includes left and right circular blades 122, 124 adapted for rotation about common central axis 126 and disposed in a fixed position during operation of the saw so as to prevent relative rotation of the blades. Each component of the device includes a front end and a back end relative to a rotational direction of travel of the blades shown by the arrow in FIG. 19 (e.g., a front end 121 and back end 123 of holding member 128). A plurality of left holding members 128 extend from an outer peripheral surface 130 of the left blade and are spaced apart from one another around the circumference of the left blade. A plurality of right holding members 132 extend from an outer peripheral surface 134 of the right blade and are spaced apart from one another around the circumference of the right blade. A plurality of left-handed replaceable teeth 136 are adapted to be removably retained on the left holding members 128. A plurality of right-handed replaceable teeth 138 are adapted to be removably retained on the right holding members 132. A plurality of left safety lobes 140 are each spaced apart from each other around the circumference of the left blade 122 and each is disposed in front of one of the right holding members 132. One of the left safety lobes 140 extends in proximity to one of the right-handed teeth 138 effective to prevent the tooth 138 from being dislodged from the right holding member 132 during rotation of the blades. A plurality of right safety lobes 142 are each spaced apart from each other around the circumference of the right blade 124 and each is disposed in front of one of the left holding members 128. One of the right safety lobes 142 extends in proximity to one of the left-handed teeth 136 effective to prevent the tooth 136 from being dislodged from the left holding member 128 during rotation of the blades.

Referring to FIGS. 18 and 19, the holding or key members have at least one seating surface. The key member has an inverted-L shape and includes a top surface 144, a long side surface 146, first and second short side surfaces 148, 150, and front and back surfaces 152, 154. Each tooth 136, 138 includes a recess 156 configured and arranged to receive the key member. The recess has an inverted-L shape that corresponds to the inverted-L shape of the holding member and includes a top recess surface 158, a long side recess surface 160, first and second short side recess surfaces 162, 164, and a front recess surface 166. The L-shaped recess is open at a back surface 168 and bottom surface 170 of the tooth. The recess includes at least one seating surface. Seating surfaces are surfaces of the tooth and holding member that contact each other. The tooth includes seating recess surface 161 located between surfaces 162, 164. Seating recess surface 161 engages holding member recess surface 159. Seating surfaces of the holding member and teeth (e.g., seating surface 159 of the holding member and seating recess surface 161) can be tapered as disclosed in the application Ser. No. 10/780,323 incorporated by reference. Any of the surfaces of the holding member and tooth recess may be tapered as disclosed in the application Ser. No. 10/780,323. It will be appreciated by those of ordinary skill in the art in view of this disclosure that the figures show but one example of a suitable design for the holding member and teeth. The tooth could include a stud and the holding member could include a recess that receives the stud. The holding member and recess could have some other shape such as a T-shape. These and many other variations in the design of the teeth and holding members are possible and contemplated to be within the scope of the present invention.

Each safety lobe 140, 142 includes a trough 172 located below the peripheral surfaces 130, 134 of the blades and a crest 174 in front of the trough extending above the peripheral surfaces 130, 134 of the blade. Optional depth gauge members or rakers 176, 178 extend higher than the crest of the safety lobes.

More specifically, referring to FIGS. 18 and 19, right holding member 132 on the right blade 124 receives a right-handed tooth 138. Proceeding relative to the rotational direction of the blades, the safety lobe 140 on the left blade 122 is in front of the tooth 138 when the blades are fixedly secured to each other, preventing the tooth from being dislodged from the right holding member 132. A raker 176 on the right blade is in front of the left safety lobe 140. Next, a left holding member 128 on the left blade 122 receives a left-handed tooth 136. The safety lobe 142 on the right blade 124 is in front of the tooth 136 when the blades are fixedly secured to each other, preventing the tooth from being dislodged from the left holding member 128. A raker 178 on the left blade is in front of the right safety lobe 142. This pattern of components continues around the circumference of the blades. Variations in the number of links between holding members, as in the case of the chain shown in FIG. 1, fall within the scope of this embodiment of the invention.

This embodiment of the invention uses two blades to achieve safe operation despite the use of quickly replaceable teeth, wherein the safety lobes of the right blade are positioned in front of the left-handed teeth and the safety lobes of the left blade are positioned in front of the right-handed teeth. The left and right blades are fixed to each other during operation by being fastened onto the arbor, which extends through the hole 127 at the rotational axis of the blades. Once the blades are separated the teeth can quickly and easily be removed from the holding members in a manner similar to the previous embodiments as there is no further obstruction. Replacement teeth are installed on the holding members. Then, the blades are once again fixed to each other and fastened onto the arbor effective to enable the safety lobes of one of the blades to prevent the teeth of the other blade from being dislodged from the holders.

When viewed along the circumference of the blades, the teeth of the circular saw members alternate right- and left-handed. Referring to FIG. 18, a central imaginary reference plane R is disposed between the saw blades perpendicular to the rotational axes 126. The left-handed teeth 136 have surfaces or cutting edges 137 that extend from the central plane R outwardly on a left side of the blades. The right-handed teeth 138 have surfaces or cutting edges 139 that extend from the central plane R outwardly on a right side of the blades. The teeth are designed with sharp cutting edges adapted to cut various materials. The teeth are especially designed to effectively cut wood. Alternatively, the teeth can be designed to include a surface adapted for abrasion of material. Teeth adapted for abrasion can be formed of various materials adapted to the material being abraded (e.g., brick, concrete or other refractory material). The teeth in all embodiments of the invention may also have a combination cutting/abrading function depending on the design of the teeth and the type of material the saw acts upon.

Left and right arbor clamping disks 180, 182, having smaller diameters than the blades 122, 124, are disposed on the sides of the blades and clamp the blades between them. The arbor disks each includes one or two offset pin openings 184, 186 or one or two pins 187, 188. In this design the right arbor disk includes two pins and the left arbor disk includes two holes. As a further possibility instead of offset bolt patterns, a large and a small pin can be used to prevent improper installation of the blades. The blades also include two offset pin openings 190, 192 (left blade) and 194, 196 (right blade). The openings 190, 194 are on a different pin pattern from the openings 192, 196. Relative to the central axis, the holes 190, 194 lie on the circumference of a circle of one diameter and the holes 192, 196 lie on the circumference of a circle of a diameter that is smaller than the first. The bolts or pins 187, 188 are welded or integrally formed on one or both of the arbors. In FIG. 17 the pins 187, 188 are welded to the right arbor disk 182. The blades and arbor disks are positioned to align the pin holes of both arbors and both blades with one another. That is, holes 184 and 186 of the left arbor disk 180 are aligned with the holes 190 and 192, respectively, of the left blade 122. The holes 194 and 196 of the right blade 124 are aligned with the holes 190 and 192 of the left blade 122. The pins 187, 188 protrude through the aligned holes. That is, pin 187 extends through holes 194, 190 and 184, and the pin 188 extends through holes 196, 192 and 186. Because of the use of the offset pin patterns, it is not possible for the user of the saw to install the blades incorrectly (e.g., backwards). In addition, the alignment of the pins in the holes of the blades precisely aligns the safety lobes of each blade relative to the teeth of the other. Another advantage of the pins projecting in the holes of the blades is that the blades cannot rotate relative to each other when the saw is used. That is, the blades are fixed in position relative to each other.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. Safety saw chain including a plurality of links each having a front end and a back end relative to a direction of travel of the chain comprising:
    a plurality of holding links each having front and back holes;
    a replaceable tooth for each said holding link, said tooth having a leading end and a trailing end relative to a direction of travel of the chain;
    each said holding link and said replaceable tooth being adapted to removably retain said tooth on said holding link; and
    a plurality of safety links each including a safety lobe, integrally formed with said safety link, extending adjacent to the leading end of said tooth at a location that obstructs the leading end of said tooth, preventing said tooth from being dislodged from said holding link during travel of the chain, said safety link leading said holding link in said chain travel direction, said safety link including front and back holes, said back hole of said safety link being aligned with said front of said holding link and directly pivotably connected with a rivet in said aligned holes.

2. The safety saw chain of claim 1 comprising a second safety link including front and back holes that are pivotably connected at the front hole of said second safety link to the back hole of said holding link, a second safety lobe being integrally formed with said second safety link and disposed near said front end of said second safety link, wherein said tooth includes a recess that is configured and arranged to receive said second safety lobe.

3. The safety saw chain of claim 1 wherein said holding link includes a depth gauge located at said front end of said holding link.

4. The safety saw chain of claim 2 wherein said safety link includes a depth gauge located upstream of said tooth.

5. The safety saw chain of claim 1 wherein said tooth is connected to said holding link without a fastener.

6. The safety saw chain of claim 1 wherein the chain includes alternating right-handed and left-handed said teeth, the chain having a central axis along the chain travel direction, wherein said left-handed teeth have cutting edges that extend from the central axis outwardly on a left side of the chain and said right-handed teeth have cutting edges that extend from the central axis outwardly on a right side of the chain.

7. The safety saw chain of claim 1, wherein said chain is adapted to be wrapped around a bar of a saw in a circuit type manner, wherein said safety link prevents said tooth from being dislodged from said holding link during all positions of said tooth throughout an entire travel of the chain around the bar of the saw, including around an end of the bar of the saw.

8. The safety saw chain of claim 1 wherein said tooth includes a sharp cutting edge.

9. The safety saw chain of claim 8 wherein each said cutting edge is adapted to cut wood.

10. The safety saw chain of claim 1 wherein each said tooth includes a surface adapted for abrasion of material.

11. The safety saw chain of claim 1 comprising connector straps that each include front and back holes; the links each including front and back holes, and rivets disposed in aligned holes of said links and said connector straps.

12. The safety chain of claim 1,
    each said holding including a seating surface;
    each said replaceable tooth that includes a seating surface, said tooth being adapted to be removably retained on said holding link such that said seating surface of said tooth engages said seating surface of said holding link, said tooth being unrestrained by contact with said seating surface of said holding link from movement in said chain travel direction.

13. The safety chain of claim 12 wherein said holding link includes a key member that includes said seating surface of said holding link, said tooth includes a recess configured and arranged to receive said key member, and said recess includes said seating surface of said tooth.

14. The safety saw chain of claim 1 wherein said safety links are drive links.

15. The safety chain of claim 1 wherein a first reference line intersects center points of said safety link holes and a second reference line is perpendicular to said first reference line at a center point of said back safety link hole, said safety lobe being disposed so as to trail said second reference line in said chain travel direction.

16. The safety saw chain of claim 15 wherein said safety links comprise a depth gauge between said first and second reference lines.

17. The safety saw chain of claim 1 wherein the saw chain is adapted for use on a saw selected from the group consisting of a chain saw, a timber harvester, a rescue saw, a buck saw and a saw for cutting wood pallets.

* * * * *